(12) United States Patent
Murphy et al.

(10) Patent No.: US 9,715,739 B2
(45) Date of Patent: Jul. 25, 2017

(54) BONE FRAGMENT TRACKING (71) Applicant: The Johns Hopkins University, Baltimore, MD (US)

(72) Inventors: Ryan J. Murphy, Columbia, MD (US); Mehran Armand, Maple Lawn, MD (US); Robert S. Armiger, Catonsville, MD (US); Yoshito Otake, Nara (JP); Jyri Lepisto, Tampere (FI)

(73) Assignee: The Johns Hopkins University, Baltimore, MD (US)

( * ) Notice: Subject to any disclaimer, the term of this patent is extended or adjusted under 35 U.S.C. 154(b) by 37 days.

(21) Appl. No.: 14/503,715

(22) Filed: Oct. 1, 2014

(65) Prior Publication Data

US 2015/0125033 A1    May 7, 2015

Related U.S. Application Data

(60) Provisional application No. 61/901,068, filed on Nov. 7, 2013.

(51) Int. Cl.
*G06K 9/00* (2006.01)
*G06T 7/246* (2017.01)

(52) U.S. Cl.
CPC .... *G06T 7/251* (2017.01); *G06T 2207/10081* (2013.01); *G06T 2207/10088* (2013.01);
(Continued)

(58) Field of Classification Search
CPC .......... A61B 19/5244; A61B 2019/507; A61B 2019/5483; A61B 2019/5295;
(Continued)

(56) References Cited

U.S. PATENT DOCUMENTS

RE42,194 E  *  3/2011  Foley et al. ................. 600/426
2002/0031204 A1   3/2002  Vilsmeier
(Continued)

FOREIGN PATENT DOCUMENTS

WO        00/28911       5/2000

OTHER PUBLICATIONS

Armand et al., Computer-Aided Orthopedic Surgery with Near-Real-Time Biomechanical Feedback, 2004, Johns Hopkins APL Technical Digest, vol. 25, No. 3, pp. 242-252.*
(Continued)

*Primary Examiner* — Vu Le
*Assistant Examiner* — Guillermo Rivera-Martinez
(74) *Attorney, Agent, or Firm* — Noah J. Hayward (57) ABSTRACT

A method of determining bone fragment navigation may include receiving pre-operative 2D image data of a reference bone structure and a bone fragment. The reference bone structure may include a first set of fiducial markers provided thereon, and the bone fragment may include a second set of fiducial markers provided thereon. The method may further include performing a 2D-3D registration between the pre-operative 2D image data and a 3D model of the reference bone structure and the bone fragment, after manual repositioning of the bone fragment, receiving second 2D image data, performing 2D-2D registration of the first set of fiducial markers and the second set of fiducial markers between the pre-operative 2D image data and the second 2D image data, and determining 3D movement of the bone fragment based at least in part on the 2D-2D registration.

16 Claims, 5 Drawing Sheets

(52) U.S. Cl.
CPC ............... *G06T 2207/10116* (2013.01); *G06T 2207/20076* (2013.01); *G06T 2207/30008* (2013.01); *G06T 2207/30204* (2013.01)

(58) Field of Classification Search
CPC ... A61B 5/4504; A61B 5/064; G06F 19/3481; G06T 2207/10081; G06T 2207/10116; G06T 2207/30008; G06T 2207/30204
See application file for complete search history.

(56) References Cited

U.S. PATENT DOCUMENTS

| | | |
|---|---|---|
| 2002/0107522 A1 | 8/2002 | Picard et al. |
| 2004/0039259 A1* | 2/2004 | Krause et al. ............... 600/300 |
| 2006/0098851 A1* | 5/2006 | Shoham et al. ............. 382/128 |
| 2007/0043354 A1* | 2/2007 | Koo .................. A61B 17/6416 606/58 |
| 2008/0269588 A1* | 10/2008 | Csavoy et al. ............... 600/407 |
| 2009/0054910 A1* | 2/2009 | Zheng et al. ................. 606/130 |
| 2011/0166447 A1* | 7/2011 | Windolf et al. ............. 600/426 |
| 2012/0106819 A1 | 5/2012 | Oca |
| 2012/0215227 A1 | 8/2012 | Fitzpatrick et al. |

OTHER PUBLICATIONS

Hamilton et al., Feb. 2012, X-Ray Image Based Navigation for Hip Osteotomy, (EN.600.446) Computer-Integrated Surgery II, pp. 1-5.*

Hamilton et al., X-Ray Image-Guided Navigation for Hip Osteotomy, May 2012, Computer Integrated Surgery II, pp. 1.*

* cited by examiner

BONE FRAGMENT TRACKING

CROSS-REFERENCE TO RELATED APPLICATIONS

This application claims priority to and the benefit of U.S. Provisional Application Ser. No. 61/901,068, filed on Nov. 7, 2013, the entire contents of which are hereby incorporated herein by reference.

STATEMENT OF GOVERNMENTAL INTEREST

This invention was made with government support under contract number R01EB006839 awarded by the National Institutes of Health (NIH). The government has certain rights in the invention.

TECHNICAL FIELD

Exemplary embodiments of the present disclosure generally relate to a surgical system for tracking bone movement, and more specifically relate to employment of image analysis to facilitate tracking of bone fragment movement during or after surgery.

BACKGROUND

Modern medicine benefits greatly from the vast number of technical advancements that are at the disposal of practitioners. Among the key technical advancements that facilitate improved medical care, medical imaging devices have been extremely important to enabling practitioners to identify issues, address those issues and verify proper healing. Computed tomography (CT) scans, x-rays, magnetic resonance imaging (MRI), ultrasound images, and the like have all been employed to great effect in improving medical care.

Although medical imaging techniques continue to improve, it should be appreciated that the timing and cost associated with employing medical imaging may not always enable such tools to be employed liberally at every possible point at which they might be useful. For example, when positioning a bone fragment during surgery, although it might be desirable to track the movement of the bone fragment in three dimensional space during the surgical procedure, it is generally not practical to employ costly and time consuming three dimensional imaging techniques at that time.

As such, imaging techniques remain tools that have to be employed when appropriate to obtain the greatest impact. However, if employed strategically and in the context of a comprehensive plan, the imaging techniques can be leveraged to be employed at the most opportune times to provide the best possible results.

BRIEF SUMMARY

Some example embodiments may enable the provision of a system capable of employing medical imaging techniques in the context of positioning and/or tracking a bone fragment during surgery. In this regard, for example, some embodiments may enable the strategic employment of a two dimensional (2D) imaging system with a three dimensional (3D) imaging system so that planning and execution of a surgical procedure involving the movement of a bone fragment can be executed without extensive hardware. In some cases, a 3D model of an area in which a bone fragment exists may be obtained pre-operation. A plurality of fiducial markers may be inserted into the field of view of a 2D imaging system to register the fiducial markers to the anatomy in the area of the bone fragment. The 2D image may be essentially back projected to the 3D model. Then, during the operation, the bone fragment may be moved and fiducial marker position may again be extracted. The movement of the bone fragment may then be calculated based on the respective fiducial marker registrations.

In one example embodiment, a bone fragment navigation system is provided. The system may include a 2D imaging sensor and an image analyzer. The 2D imaging sensor may be configured to generate pre-operative 2D image data of a reference bone structure and a bone fragment. The reference bone structure may include a first set of fiducial markers provided thereon, and the bone fragment may include a second set of fiducial markers provided thereon. The 2D imaging sensor may be further configured to provide second 2D image data after manual repositioning of the bone fragment. The image analyzer may be in communication with the 2D imaging sensor during an operation. The image analyzer may be configured to receive the pre-operative 2D image data and perform a 2D-3D registration between the pre-operative 2D image data and a 3D model of the reference bone structure and the bone fragment. The image analyzer may be further configured to, after the manual repositioning of the bone fragment, receive the second 2D image data, perform 2D-2D registration of the first set of fiducial markers and the second set of fiducial markers between the pre-operative 2D image data and the second 2D image data, and determine 3D movement of the bone fragment based at least in part on the 2D-2D registration.

In another example embodiment, a method of determining bone fragment navigation is provided. The method may include receiving pre-operative 2D image data of a reference bone structure and a bone fragment. The reference bone structure may include a first set of fiducial markers provided thereon, and the bone fragment may include a second set of fiducial markers provided thereon. The method may further include performing a 2D-3D registration between the pre-operative 2D image data and a 3D model of the reference bone structure and the bone fragment, after manual repositioning of the bone fragment, receiving second 2D image data, performing 2D-2D registration of the first set of fiducial markers and the second set of fiducial markers between the pre-operative 2D image data and the second 2D image data, and determining 3D movement of the bone fragment based at least in part on the 2D-2D registration.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may enable the provision of a mechanism by which to position and/or track a bone fragment during an operation. In this regard, fiducial markers may be used within a 2D image to register the locations of such markers and the corresponding structures to which they are attached within a 3D environment associated with a 3D model of the area. During (or after) the operation involving movement of the bone fragment, another 2D image may be obtained and locations of the fiducial markers may be registered relative to the prior locations to calculate movement of the fiducial markers responsive to movement of the bone fragment. Accordingly, the movement of the bone can be tracked during the procedure without any additional hardware beyond the use of an x-ray.

Figure 1:
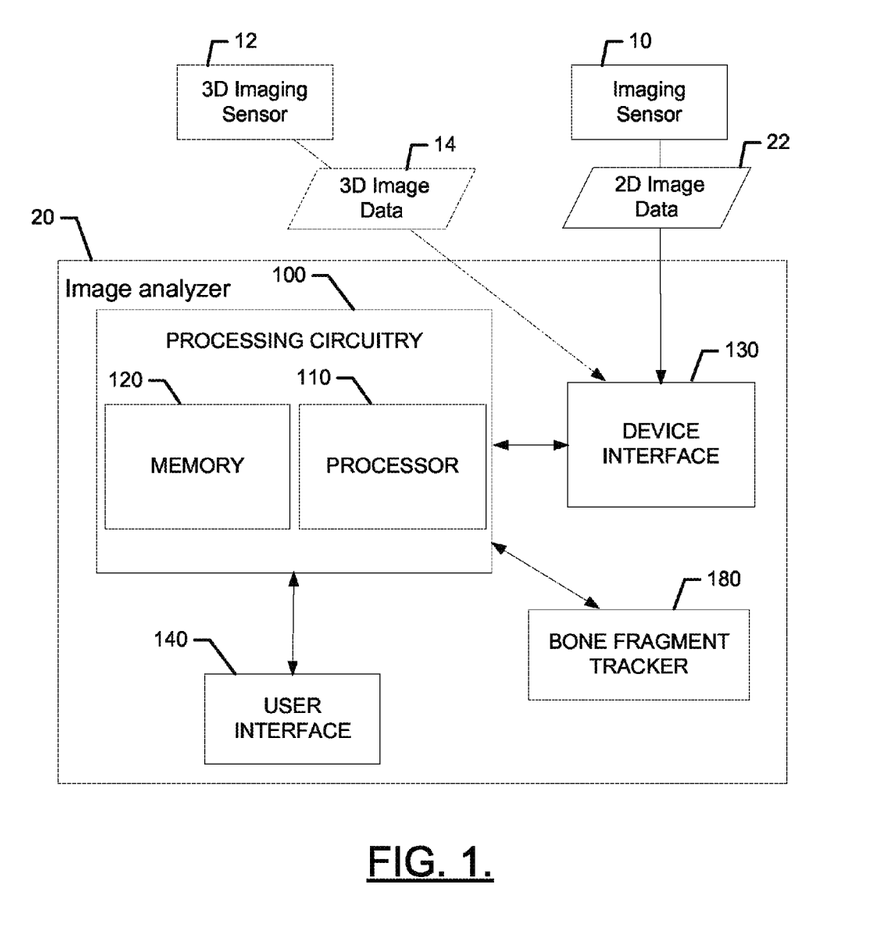
FIG. 1 illustrates a block diagram showing one example of a navigation system of an example embodiment.

FIG. 1 illustrates a block diagram showing one example of a bone fragment tracking system of one example embodiment. In this example, the bone fragment tracking system is embodied as a computer controlled device, or at least as a suite of devices interfacing with or under the control of a computer. Thus, for example, the bone fragment tracking system may include an imaging sensor 10 and an image analyzer 20. The imaging sensor 10 may be an imaging device configured to obtain two dimensional (2D) images of a subject. Thus, for example, the imaging sensor 10 may be a 2D imaging sensor such as an x-ray imaging device.

Of note, as shown in FIG. 1, the image analyzer 20 may interface with the imaging sensor 10 to receive 2D image data 22. However, the image analyzer 20 may also receive three dimensional (3D) image data 14, which may be provided from a 3D imaging sensor 12. The data collectable by the imaging sensor 10 (and the 3D imaging sensor 12) may be captured non-invasively by obtaining image data using equipment/sensors that remain external to the body, but measure radiation that passes through and/or reflects off of various body parts. In some cases, the imaging sensor 10 may generate x-ray image data and the 3D imaging sensor 12 may be embodied as ultrasound, computed tomography (CT) scan, or magnetic resonance imaging (MRI). However, other modalities may also be employed.

The imaging sensor 10 may provide image the 2D image data 22 to the image analyzer 20, which may be configured to receive and process the 2D image data 22 captured by the imaging sensor 10 in order to generate results that may be used to determine movement of a bone fragment in a body based on correlating the 2D image data 22 with a 3D model that may be generated from the 3D image data 14. In some cases, the image analyzer 20 may receive the 2D image data 22 in at least two different instances, one of which is prior to a surgical operation and the other of which is provided during or after the surgical operation. Meanwhile, the 3D image data 14 may be provided prior to the surgical operation to generate the 3D model of the environment in which bone fragment tracking will occur. As such, in at least some cases, the image analyzer 20 may operate in real time (or near real time) to track movement of the bone fragment during an operation. However, in other cases, image data (2D and/or 3D) from the imaging sensors may be stored first, and may thereafter be retrieved from storage before being analyzed by the image analyzer 20.

As shown in FIG. 1, the image analyzer 20 may include or otherwise be in communication with processing circuitry 100 that is configurable to perform actions in accordance with example embodiments described herein. As such, for example, at least some of the functions attributable to the image analyzer 20 may be carried out by or otherwise instructed by the processing circuitry 100. The processing circuitry 100 may therefore provide the hardware for hosting software to configure the system for machine learning and machine driven analysis techniques consistent with example embodiments. Detection of various marker elements (e.g., fiducial markers) and registration of such markers between different images to determine the movement thereof may, for example, be accomplished using the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard).

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, one or more buttons or keys (e.g., function buttons), and/or other input/output mechanisms (e.g., keyboard, microphone, speakers, cursor, joystick, lights and/or the like). The user interface 140 may display information indicating an identity or certain characteristics of a data set (e.g., including images or results of analyzing images) being processed by the image analyzer 20. The characteristics of the data set may then be processed and information associated therewith may be presented on a display of the user interface 140 based on instructions executed by the processing circuitry 100 for the analysis of the data according to prescribed methodologies and/or algorithms. Moreover, in some cases, the user interface 140 may include options for selection of one or more reports to be generated based on the analysis of a given data set.

The device interface 130 may include one or more interface mechanisms for enabling communication with other external devices (e.g., the imaging sensor 10 and/or the 3D imaging sensor 12) or internal functional components of the image analyzer 20. In some cases, the device interface 130 may be any means such as a device or circuitry embodied in either hardware, or a combination of hardware and software that is configured to receive and/or transmit data from/to devices in communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the image analyzer 20 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns, image data, feature vectors, histograms, processing algorithms and/or the like to be employed for the execution of example embodiments. Among the contents of the memory 120, applications may be stored for execution by the processor 110 in order to carry out the functionality associated with each respective application. In some cases, the applications may include directions for control of the image analyzer 20 to generate and/or employ analytical tools for analyzing image data to identify fiducial markers, register such markers between respective images or data sets, and computing movement of a bone fragment based on the corresponding movement of the fiducial markers as described herein. In some cases, the applications may further include directions for generating outputs and/or reports associated with analysis of patient data as described herein.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the image analyzer 20. As such, in some embodiments, the processor 110 (or the processing circuitry 100) may be said to cause each of the operations described in connection with the image analyzer 20 by directing the image analyzer 20 to undertake the corresponding functionalities responsive to execution of instructions or algorithms configuring the processor 110 (or processing circuitry 100) accordingly.

In an example embodiment, data captured in association with image scanning of the body of a particular patient may be stored (e.g., in the memory 120) or passed directly to the image analyzer 20. Thereafter, the data may be processed by the image analyzer 20 to enable the processing circuitry 100 to process the data in real time (or near real time) or to process the data as the data is extracted from memory. In an example embodiment, the image analyzer 20 may include a bone fragment tracker 180 that may be configured to perform registration of fiducial markers between images or data sets to compute movement of the fiducial markers between such images or data sets. Accordingly, to the extent the fiducial markers are attached to bones where one set of fiducial markers is relatively fixed in an environment and another set of fiducial markers is attached to a bone fragment that is to be moved or relocated during surgery, the bone fragment tracker 180 may be configured to determine the movement of the bone fragment within its environment.

Figure 2:
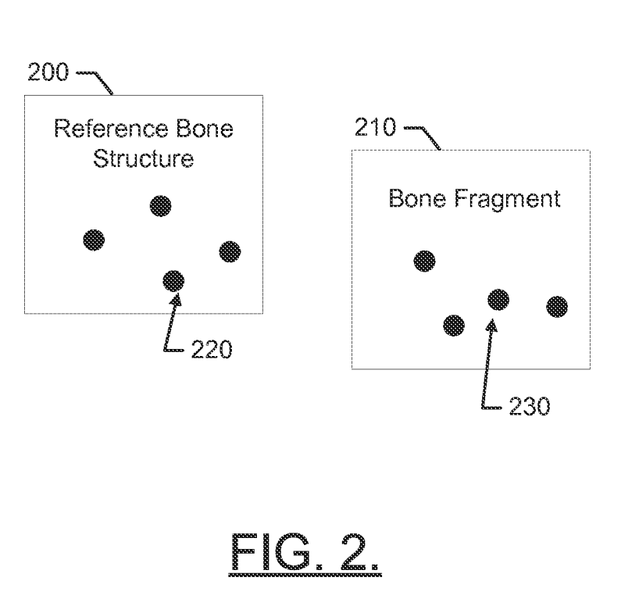
FIG. 2 illustrates a block diagram of preparation activities that may be performed to enable a bone fragment tracker to operate in accordance with an example embodiment.
Figure 3:
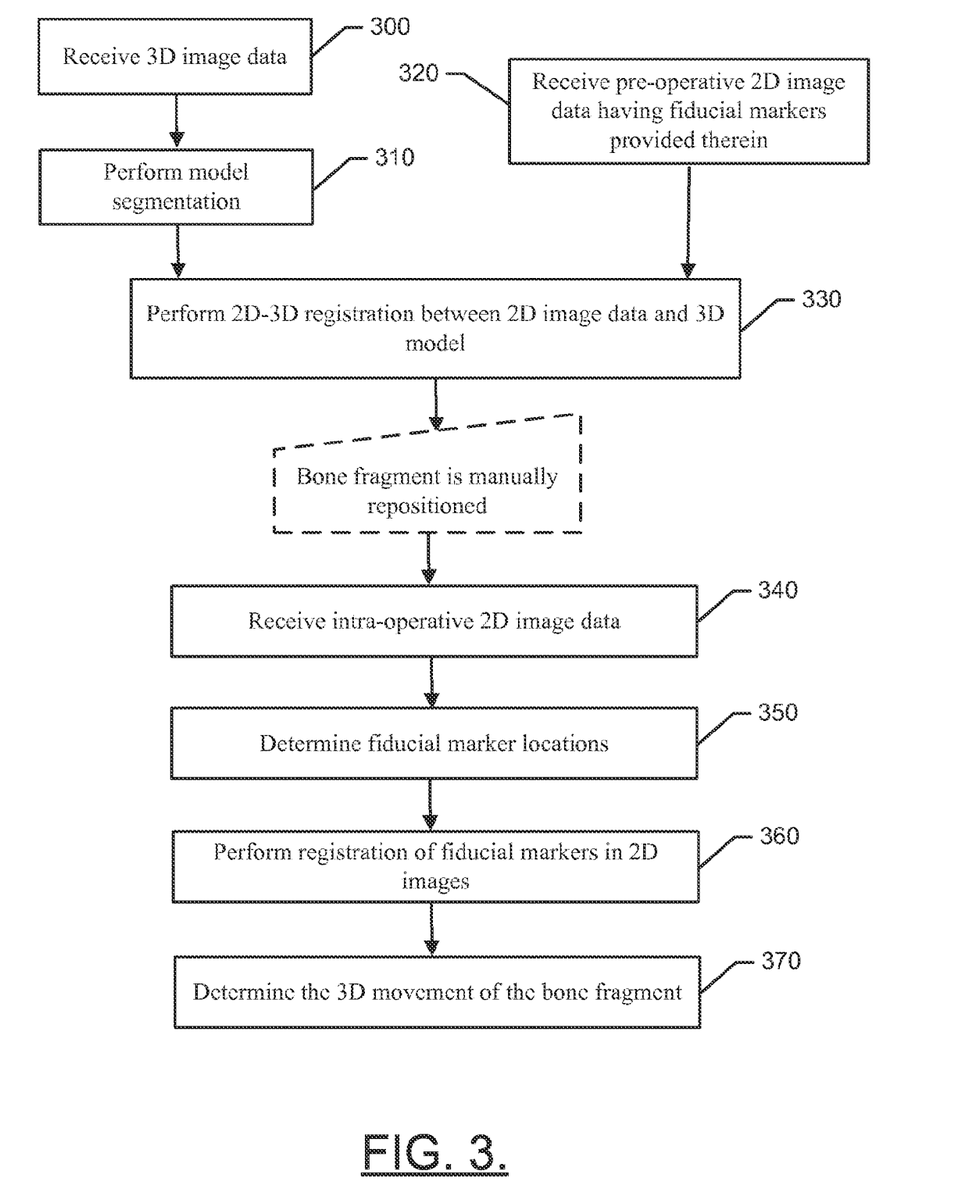
FIG. 3 illustrates a block diagram of actions that the bone fragment tracker may be configured to perform in accordance with an example embodiment.

In an example embodiment, the bone fragment tracker 180 may be any means such as a device or circuitry embodied in either hardware, or a combination of hardware and software that is configured to perform the corresponding functions of the bone fragment tracker 180 as described herein under the control of the processing circuitry 100. In an example embodiment, the bone fragment tracker 180 may be configured to perform various actions associated with determining the positions of fiducial markers within a particular location being examined. FIG. 2 illustrates a block diagram of some of the preparation activities that may be performed to enable the bone fragment tracker 180 to operate in accordance with an example embodiment. FIG. 3 illustrates a block diagram of some of the actions that the bone fragment tracker 180 may be configured to perform in accordance with an example embodiment.

Of note, the environment being examined may include at least a reference bone structure 200 and a bone fragment 210, each of which may have a set of fiducial markers installed thereon. The fiducial markers may be embodied as relatively small (e.g., round) metallic objects that can be placed on various surfaces of the reference bone structure and the bone fragment. Thus, for example, a first set of fiducial markers 220 may be placed on the reference bone structure 200. Meanwhile, a second set of fiducial markers 230 may be placed on the bone fragment 210. The reference bone structure 200 may be expected to be relatively stable within the operative environment. Thus, the first set of fiducial markers 220 may provide a reference relative to which movement of the second set of fiducial markers 230 (and corresponding movement of the bone fragment 210) may be measured. In some cases, the sizes of the fiducial markers may be different between the first set of fiducial markers 220 and the second set of fiducial markers 230 to facilitate discrimination of such markers. Thus, for example, a diameter, shape or size of the first set of fiducial markers 220 may be different than that of the second set of fiducial markers 230.

The first and second sets of fiducial markers 220 and 230 may each include at least three (and in some cases four) individual elements that are placed so that they are not collinear or coplanar. Preferably, some minimal amount of spacing (e.g., a few cm) may also be provided when the reference bone structure 200 and bone fragment 210 are of sufficient size to permit such spacing. The first set of fiducial markers 220 may be used as confidence points to provide a virtual frame of reference for the image analyzer 20 during a surgical procedure. The second set of fiducial markers 230 may move as the bone fragment 210 is repositioned to allow the movement of the bone fragment 210 to be tracked during (or after) surgery.

As shown in FIG. 3, the bone fragment tracker 180 may be configured to receive 3D image data at operation 300 and perform model segmentation at operation 310. At operation 320, a preoperative 2D image (e.g., an x-ray image) may be received with the fiducial markers provided therein. Of note, the 3D image data may be generated either before or after the fiducial markers are placed. Registration of the 2D image data with the 3D model may then be performed at operation 330 to orient the 2D image and the fiducial markers therein relative to the 3D model. Of note, the 2D images may be obtained from a calibrated system such that, for example, the calibration is obtained either through a characterization using a dewarping phantom or from the manufacturer depending on the type of x-ray image intensifier used.

The registration of the 2D image with the 3D model defines a registration between the patient and the model. The fiducial locations may be identified in each image and may be triangulated. Thereafter, a repositioning of the bone fragment or some other surgical operation thereon may be conducted manually. During or after the repositioning, one or more intraoperative 2D images may be obtained at operation 340 and provided to the bone fragment tracker 180. The bone fragment tracker 180 may segment these images and again triangulate or otherwise determine fiducial marker locations at operation 350 (e.g., using a radial symmetry algorithm). The bone fragment tracker 180 may then, at operation 360, conduct registration between the fiducial markers in the 2D image data obtained at operation 320 and at operation 340. Since the world frame of the x-ray image intensifier may have changed between preoperative images, the confidence points (e.g., the first set of fiducial markers 220) are registered with each other to define the transformation from the preoperative images to the post operative images. The triangulated or otherwise determined post operative fiducial locations of the bone fragment 210 (e.g., the second set of fiducial markers 230) may be transformed into the preoperative image frames that have been properly registered in order to enable the bone fragment tracker 180 to define or otherwise determine the 3D movement of the bone fragment 210 at operation 370. Accordingly, example embodiments may enable computation and visualization of fragment realignment. Various visual image based, and/or computational based representations of the movement of the fragment may then be presented to the surgeon or operator. The fragment may also be characterized through biomechanics and radiographic angles.

In some cases, the bone fragment 210 may have first (unmoved) position and a second (moved) position and the image analyzer may perform the computations above in order to generate a value descriptive of movement of the bone fragment 210 in terms of both position and orientation between the first and second positions. The value may be a 3×3 rotation matrix with 6 numbers and/or a movement vector describing the movement. Pose estimation may be employed to facilitate the value generation as well.

An example will now be described in connection with a periacetabular osteotomy (PAO), which is a joint reconstruction surgery intended to increase femoral head coverage and improve stability in patients diagnosed with developmental dysplasia of the hip (DHH). However, it should be appreciated that examples may also apply to numerous other bone related procedures. A suite of components referred to as a biomechanical guidance system (BGS) may include the image analyzer 20 described above, along with an x-ray imaging system. The BGS may therefore provide x-ray image-guided navigation for performing the PAO. The first set of fiducial markers may be provided into the pelvis ilium to provide the virtual reference frame and the bone fragment undergoing realignment may be provided with the second set of fiducial markers.

Figure 4:
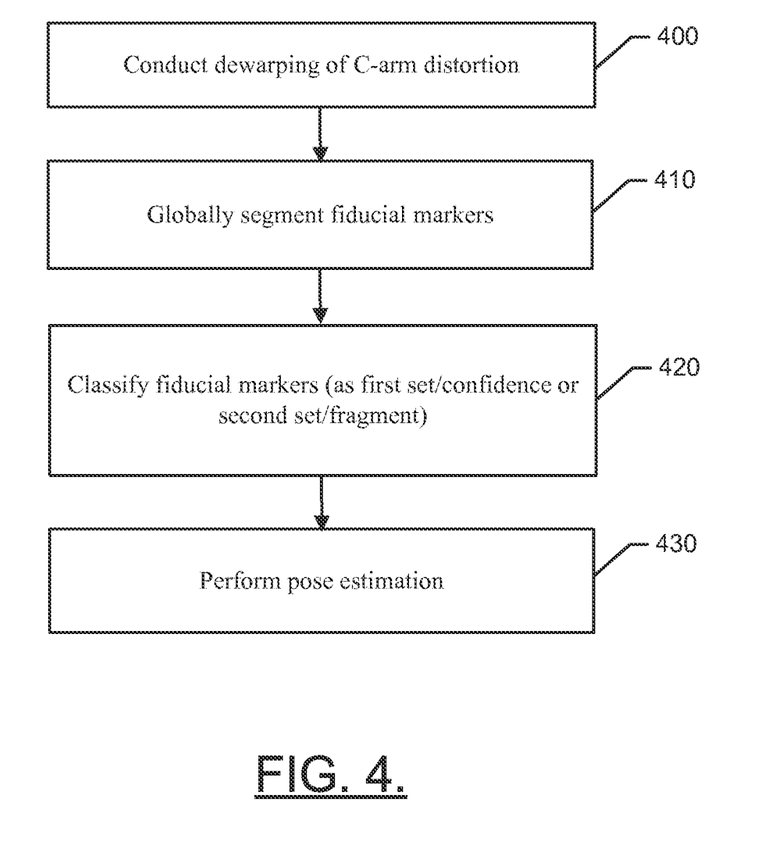
FIG. 4 illustrates a block diagram for sub-steps associated with image acquisition according to an example embodiment.

After the fiducial markers are placed, but prior to realignment, multiple pre-operative C-arm images may be obtained in different poses. The C-arm (x-ray) images may be registered with a pre-operative CT model. A fluoroscopic tracker may be non-rigidly placed in the field of view near the pelvis to facilitate computation of image poses. As such, the fluoroscopic tracker may serve as another fiducial containing points, lines, ellipses and/or other shapes in a configuration that may allow a six degree of freedom C-arm pose to be uniquely calculated from any view. A plurality of preoperative images may be obtained at various angles at this stage. FIG. 4 illustrates a block diagram for sub-steps associated with image acquisition. Of note, the images may be obtained with at least a minimum amount of separation (e.g., 30 degrees) in some cases.

As shown in FIG. 4, dewarping of C-arm distortion may initially be accomplished at operation 400. Thereafter, fiducial markers may be globally segmented at operation 410. Fiducial markers may then be classified at operation 420 as either being confidence fiducial markers, fragment fiducial markers or fluoroscopic tracker fiducial markers (if used). C-arm poses estimation may then be accomplished at operation 430 and the C-arm images may be registered with the CT volume at operation 440.

Prior to the realignment of the bone fragment, the fluoroscopic tracker may be removed (if employed). Then, the fluoroscopic tracker may be reinserted (again, if employed) and intra-operative C-arm images may be captured using a similar methodology to that described above in reference to FIG. 4 except that, for example, the registration may only be between fiducials of the 2D images instead of computing another 2D-3D registration.

Using the pose information of the pre-operative and intra-operative x-ray images provided by the fluoroscopic tracker, the rigid transformation mapping of the unmoved bone fragment to the realigned bone fragment is computed. The transformation may then be used to update the fragment location in the CT model. The BGS then computes the radiographic angels and biomechanical measures, whose ideal values will be obtained by proper fragment realignment. In various experiments, fragment transformation as computed by the BGS has been used as ground truth against which the accuracy of the x-ray method-derived fragment transformation has been compared to confirm the accuracy of example embodiments. If a biomechanical plan was generated for movement of the bone fragment, the movement can be compared to the plan to confirm that the new configuration matches the plan. In some cases, steps described above may be repeated to adjust bone fragment position, compute the movement and conduct further movement to achieve desired results.

In an example embodiment, the location of the fiducial markers may be backprojected into the patient coordinate frame. To accomplish such backprojection, it may be necessary to know which fiducial markers correspond to one another across multiple pre-operative (or post-operative) x-ray image sets. Epipolar geometry may be employed to achieve such correspondences in some cases. Accordingly, for example, epipoloar geometry involving two images at different angles looking at the same point may be employed. The image of one imaging device in the projection center of the other imaging device is called the epipole. The epipolar plane may be defined by the corresponding imaging device centers along with the common point. The intersection of the epipolar plane with a left (or right) image plane is called the left (or right) epipolar line. According to the epipolar constraint, a point on the epipolar line in one image must lie on the corresponding epipolar line in the other image. Thus, given a fiducial marker located in one x-ray image, the same fiducial marker in a second image should be found along its epipolar line. When several fiducials may be located on the epipolar line, more than one x-ray image can be used to identify a fiducial at the intersection of the respective epipolar lines.

For pose estimation, two example algorithms for estimating C-arm pose may include Pose from Orthograph and Scaling (POSIT) and Expectation Conditional Maximization (ECM). POSIT is an iterative algorithm for estimating object pose from a single image. POSIT uses at least four non-coplanar fiducials as feature points. One advantage of the POSIT algorithm is that it does not require an initial guess. However, feature point correspondences between the images must be known.

In contrast to POSIT, ECM does require prior knowledge of matching feature points. The algorithm iteratively updates a correspondence probability between each pixel in the first image with each pixel in the second image. However, convergence to the correct solution is sensitive to the estimated pose used for initialization. In some examples, results from POSIT may be used to initialize ECM.

Both of these pose estimation algorithms output an extrinsic parameter matrix, $T_{ext}$, which maps points from the C-arm reference frame to the known world reference frame (the fluoroscopic tracker-centered patientframe). The intrinsic parameters of the C-arm are known from preoperative calibration and stored in a matrix $T_{int}$. The projection matrix that transforms points from 3-dimensional patient space to x-ray image space is given by $P=T_{int} \cdot T_{ext}$. If it is assumed that there are n pre-operative (or intra-operative) x-ray images, then there are n projection matrices, $\{P_1, \ldots, P_n\}$.

In order to begin to compute the desired fragment transformation, the 3D coordinates of the fiducial markers in the fluoroscopic tracker reference frame must be recovered. These may be computed from the 2D coordinates of the fiducial markers in the X-ray images via backprojection. This mathematical transform utilizes the previously obtained projection matrices to backproject the 2D coordinates into the 3D fluoroscopic tracker reference frame.

Recall that the projection matrices $P_1, \ldots, P_n$ for n image views (obtained via the pose estimation functions) are given by $$P_n = \begin{bmatrix} p_1 & p_4 & p_7 & p_{10} \\ p_2 & p_5 & p_8 & p_{11} \\ p_3 & p_6 & p_9 & p_{12} \end{bmatrix}_n.$$

Consider the 2D locations of a particular fiducial marker in each of the n x-ray images, given by $$BB_{2D} = \begin{bmatrix} BB_{x1} & BB_{y1} \\ \vdots & \\ BB_{xn} & BB_{yn} \end{bmatrix}.$$

Define the ray pointing from the detector source (of the C-arm) to the 2D coordinate of the fiducial marker in the $i^{th}$ x-ray image as $$r_i = \begin{bmatrix} p_1 & p_4 & p_7 \\ p_2 & p_5 & p_8 \\ p_3 & p_6 & p_9 \end{bmatrix}_i^{-1} \begin{bmatrix} BB_{xi} \\ BB_{yi} \\ 1 \end{bmatrix}.$$

Consider the position of the x-ray source in the fluoroscopic tracker reference frame for the $i^{th}$ x-ray image to be defined as $$s_i = -\begin{bmatrix} p_1 & p_4 & p_7 \\ p_2 & p_5 & p_8 \\ p_3 & p_6 & p_9 \end{bmatrix}_i^{-1} \begin{bmatrix} p_{10} \\ p_{11} \\ p_{12} \end{bmatrix}_i.$$

Determining the 3D coordinates of the backprojected point $\bar{P}=(P_x, P_y, P_z)$ can be cast into a least squares minimization problem $$\min \sum_{i=1}^{N} \left\| \vec{P} - (\vec{s}_i + d_i \vec{r}_i) \right\|.$$

The reason that the prior minimization expression holds is that the 3D coordinates of the backprojected point can be defined as the intersection of the lines that join the source of each x-ray image to 2D coordinates of the fiducial marker in that x-ray image.

Formally rewriting the minimization above, which will give the 3D coordinates of the backprojected point $\bar{P}=(P_x, P_y, P_z)$ as a least squares minimization problem gives rise to the following:

$$\begin{bmatrix} 1 & 0 & 0 & -r_{1,x} & 0 & \ldots & 0 \\ 0 & 1 & 0 & -r_{1,y} & 0 & \ldots & 0 \\ 0 & 0 & 1 & -r_{1,z} & 0 & \ldots & 0 \\ 1 & 0 & 0 & 0 & -r_{2,x} & \ldots & 0 \\ 0 & 1 & 0 & 0 & -r_{2,y} & \ldots & 0 \\ 0 & 0 & 1 & 0 & -r_{2,z} & \ldots & 0 \\ \vdots & \vdots & \vdots & \vdots & \vdots & & \vdots \\ 1 & 0 & 0 & 0 & 0 & \ldots & -r_{n,x} \\ 0 & 1 & 0 & 0 & 0 & \ldots & -r_{n,y} \\ 0 & 0 & 1 & 0 & 0 & \ldots & -r_{n,z} \end{bmatrix} \begin{bmatrix} P_x \\ P_y \\ P_z \\ d_1 \\ d_2 \\ \vdots \\ d_n \\ P \end{bmatrix} = \begin{bmatrix} s_{1,x} \\ s_{1,y} \\ s_{1,z} \\ s_{2,x} \\ s_{2,y} \\ s_{2,z} \\ \vdots \\ s_{n,x} \\ s_{n,y} \\ s_{n,z} \end{bmatrix}$$

Note that the variables named $d_1, \ldots, d_n$ above are computed along with $\bar{P}=(P_x, P_y, P_z)$ in the solution to the least squares minimization, but are only of interest when the residual is computed (that is, the distance between each backprojection line and the computed point $\bar{P}$. Solving the least square equation $P=A\backslash B$ allows $\bar{P}=(P_x, P_y, P_z)$ to be recovered from P. After the 3D coordinates of each fiducial marker with respect to the fluoroscopic tracker reference frame have been recovered by the treatment, the fragment transformation may be computed by defining standard reference frames with respect to the confidence and fragment fiducial markers.

In order to compare the value of a transformation given by an optical method and x-ray navigated procedure, computation of a standard confidence reference frame (CRF) and a standard fragment reference frame (FRF) may be accomplished. To determine the CRF, four confidence points given in a fluoroscopic tracker-centered patient space may be called $p_1$, $p_2$, $p_3$ and $p_4$. The axes of the standard frame may be defined as such:

x-axis: $\hat{x}$=normalize($p_2-p_1$).
z-axis: $\hat{y}$normalize(($p_3-p_1$)×($p_2-p_1$))
y-axis: $\hat{z}\times\hat{x}$ If the three components of $\hat{x}$ are defined as and x(1), x(2), and x(3) similarly for $\hat{y}$ and $\hat{z}$), the rotational part of the transformation from the fluoroscopic tracker-centered patient space to the CRF is $$R_{FTRAC}^{CRF} = \begin{bmatrix} x(1) & x(2) & x(3) \\ y(1) & y(2) & y(3) \\ z(1) & z(2) & z(3) \end{bmatrix}.$$

The origin of the CRF is chosen as the center of mass of the confidence points: $\bar{p}=\frac{1}{4}\Sigma_{i=1}^{4}p_i$. This is also the translational component $t_{FTRAC}^{CRF}$.

Table 1 below shows notation that may be used for explaining this example. In addition, $T_A^{B1}$ denotes the transformation that takes coordinate frame A to frame B.

TABLE 1

Notation used when obtaining the pre-to-post fragment transformation.

| Notation | Description |
| --- | --- |
| FRF | Fragment point standard reference frame |
| CRF | Confidence point standrd reference frame |
| FTRAC_pre | FTRAC world frame, pre-realignment |
| FTRAC_post | FTRAC world frame, post-realignment |
| Opt_pre | Optical tracker frame, pre-realignment |
| Opt_post | Optical tracker frame, post-realignment |

For the x-ray navigated system of an example embodiment, the pre-alignment to post-alignment fragment transformation may be computed as: $T_{frag\_pre}^{frag\_post}=(T_{FTRAC\_pre}^{frag\_pre})^{-1} \cdot T_{FTRAC\_pre}^{CRF} \cdot T_{CRF}^{FTRAC\_post} \cdot T_{FTRAC\_post}^{frag\_post}$. An analogous procedure may be used to obtain the fragment transformation using optical data as follows: $\tilde{T}_{frag\_pre}^{frag\_post}=(T_{opt\_pre}^{frag\_pre})^{-1} \cdot T_{opt\_pre}^{CRF} \cdot T_{CRF}^{opt\_post} \cdot T_{opt\_post}^{frag\_post}$. The accuracy of the transformation may be quantified by computing $T^{err}=(T_{frag_{pre}}^{frag_{post}})^{-1} \cdot (\tilde{T}_{frag_{pre}}^{frag_{post}})$ and extracting the translational error (x, y, and the Euler angles ($\theta_x$, $\theta_y$, $\theta_z$).

Figure 5:
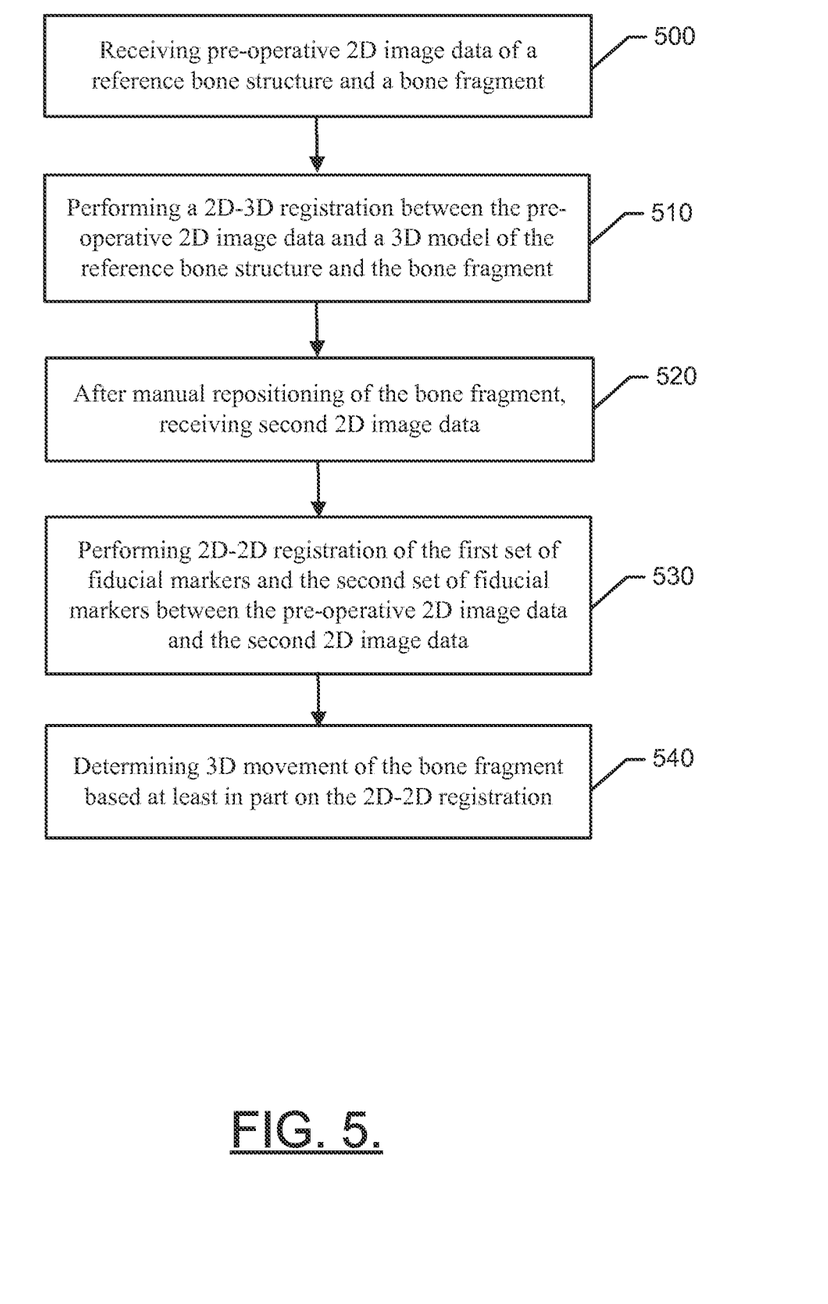
FIG. 5 illustrates an exemplary block diagram of a method according to an example embodiment.

FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. The instructions, when executed, transform the special purpose hardware into a tool for computing and/or tracking the movement of a bone fragment and providing outputs indicative of the same to guide a surgeon through the process of navigating the bone fragment within the operative environment, or confirming proper or desired movement of the bone fragment relative to an operative plan. As such, the tool may provide a visual indication of movement of the bone fragment relative to a desired position or path in real time or near real time.

In this regard, a method of facilitating navigation of a bone fragment according to one embodiment of the invention is shown in FIG. 5. The method of FIG. 5 may entirely, or at least in part, be executed automatically (e.g., without operator interaction to initiate each step or the series of steps) by processing circuitry. However, as described above, there are some manual steps that are employed (i.e., insertion of fiducial markers and repositioning of the bone fragment) between or before some of the automatically initiated or executed steps. The method may include receiving pre-operative 2D image data of a reference bone structure and a bone fragment at operation 500. The reference bone structure may include a first set of fiducial markers provided thereon, and the bone fragment may include a second set of fiducial markers provided thereon. The method may further include performing a 2D-3D registration between the pre-operative 2D image data and a 3D model of the reference bone structure and the bone fragment at operation 510 and, after manual repositioning of the bone fragment, receiving second 2D image data at operation 520. The method may further include performing 2D-2D registration of the first set of fiducial markers and the second set of fiducial markers between the pre-operative 2D image data and the second 2D image data at operation 530, and determining 3D movement of the bone fragment based at least in part on the 2D-2D registration at operation 540.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. In an example embodiment, the method may further include receiving 3D image data pre-operatively and generating the 3D model based on the 3D image data. In such an example, the pre-operative 2D image data and the second 2D image data may be x-ray image data, and the 3D image data may be computed tomography (CT) scan data. Additionally or alternatively, the method may further include comparing determined 3D movement of the bone fragment to a biomechanical plan for positioning of the bone fragment. In some examples, the method may further include displaying an output indicative of the 3D movement of the bone fragment during an operation for repositioning of the bone fragment to facilitate further repositioning of the bone fragment. In an example embodiment, the second 2D image data may be obtained intraoperatively or post-operatively. In some cases, performing 2D-2D registration may include identifying the first set of fiducial markers and the second set of fiducial markers in each of the pre-operative 2D image data and the second 2D image data to determine fiducial marker locations of each of the first set of fiducial markers and the second set of fiducial markers. In such an example, the first set of fiducial markers each have at least one physical characteristic that is different than a corresponding physical characteristic of the second set of fiducial markers to facilitate identifying the first set of fiducial markers and the second set of fiducial markers, respectively. In some embodiments, performing 2D-2D registration of the first set of fiducial markers and the second set of fiducial markers may include conducting dewarping of x-ray image distortion, globally segmenting fiducial markers, classifying fiducial markers to identify the first set of fiducial markers and the second set of fiducial markers, respectively, and performing pose estimation based on fiducial marker locations. In some cases, although not required, a fluoroscopic tracker fiducial marker may be further employed with respect to performing 2D-2D registration.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method comprising:
receiving pre-operative two dimensional (2D) image data of a reference bone structure and a bone fragment, the reference bone structure including a first set of fiducial markers provided on the reference bone structure, and the bone fragment including a second set of fiducial markers provided on the bone fragment;
receiving 3D image data pre-operatively from a 3D imaging sensor;
generating a 3D model of the reference bone structure and the bone fragment based on the 3D image data;
performing a 2D-3D registration between the pre-operative 2D image data and the 3D model of the reference bone structure and the bone fragment;
after manual repositioning of the bone fragment, receiving second 2D image data;
performing 2D-2D registration of the first set of fiducial markers and the second set of fiducial markers between the pre-operative 2D image data and the second 2D image data, wherein the performing 2D-2D registration comprises identifying the first set of fiducial markers and the second set of fiducial markers in each of the pre-operative 2D image data and the second 2D image data to determine fiducial marker locations of each of the first set of fiducial markers and the second set of fiducial markers; and
determining 3D movement of the bone fragment based at least in part on the 2D-2D registration.

2. The method of claim 1, wherein the pre-operative 2D image data and the second 2D image data comprises x-ray image data, and wherein the 3D image data comprises computed tomography (CT) scan data.

3. The method of claim 1, wherein the second 2D image data is obtained intraoperatively or post-operatively.

4. The method of claim 1, wherein the first set of fiducial markers each have at least one physical characteristic that is different than a corresponding physical characteristic of the second set of fiducial markers to facilitate identifying the first set of fiducial markers and the second set of fiducial markers, respectively.

5. The method of claim 1, further comprising comparing determined 3D movement of the bone fragment to a biomechanical plan for positioning of the bone fragment.

6. The method of claim 1, wherein the performing 2D-2D registration of the first set of fiducial markers and the second set of fiducial markers further comprises:
conducting dewarping of x-ray image distortion;
globally segmenting fiducial markers;
classifying fiducial markers to identify the first set of fiducial markers and the second set of fiducial markers, respectively; and
performing pose estimation based on fiducial marker locations.

7. The method of claim 1, further comprising displaying an output indicative of the 3D movement of the bone fragment during an operation for repositioning of the bone fragment to facilitate further repositioning of the bone fragment.

8. The method of claim 1, wherein a fluoroscopic tracker fiducial marker is further employed with respect to performing 2D-2D registration.

9. A bone fragment navigation system comprising:
a 2D imaging sensor configured to generate pre-operative two dimensional (2D) image data of a reference bone structure and a bone fragment, the reference bone structure including a first set of fiducial markers provided on the reference bone structure, and the bone fragment including a second set of fiducial markers provided on the bone fragment, the 2D imaging sensor being further configured to provide second 2D image data after manual repositioning of the bone fragment; and an image analyzer in communication with the 2D imaging sensor during an operation, the image analyzer being configured to:
  receive the pre-operative 2D image data;
  receive 3D image data pre-operatively from a 3D imaging sensor;
  generate a 3D model of the reference bone structure and the bone fragment based on the 3D image data;
  perform a 2D-3D registration between the pre-operative 2D image data and the 3D model of the reference bone structure and the bone fragment;
  after the manual repositioning of the bone fragment, receive the second 2D image data;
  perform 2D-2D registration of the first set of fiducial markers and the second set of fiducial markers between the pre-operative 2D image data and the second 2D image data, wherein performing 2D-2D registration comprises identifying the first set of fiducial markers and the second set of fiducial markers in each of the pre-operative 2D image data and the second 2D image data to determine fiducial marker locations of each of the first set of fiducial markers and the second set of fiducial markers; and
  determine 3D movement of the bone fragment based at least in part on the 2D-2D registration.

10. The bone fragment navigation system of claim 9, wherein the 2D imaging sensor comprises an x-ray machine, and wherein the 3D image data comprises computed tomography (CT) scan data.

11. The bone fragment navigation system of claim 9, wherein the second 2D image data is obtained intraoperatively or post-operatively.

12. The bone fragment navigation system of claim 9, wherein the first set of fiducial markers each have at least one physical characteristic that is different than a corresponding physical characteristic of the second set of fiducial markers to facilitate identifying the first set of fiducial markers and the second set of fiducial markers, respectively.

13. The bone fragment navigation system of claim 9, wherein the image analyzer is further configured to compare determined 3D movement of the bone fragment to a biomechanical plan for positioning of the bone fragment.

14. The bone fragment navigation system of claim 9, wherein performing 2D-2D registration of the first set of fiducial markers and the second set of fiducial markers further comprises:
  conducting dewarping of x-ray image distortion;
  globally segmenting fiducial markers;
  classifying fiducial markers to identify the first set of fiducial markers and the second set of fiducial markers, respectively; and
  performing pose estimation based on fiducial marker locations.

15. The bone fragment navigation system of claim 9, further comprising a user interface configured for displaying an output indicative of the 3D movement of the bone fragment during an operation for repositioning of the bone fragment to facilitate further repositioning of the bone fragment.

16. The bone fragment navigation system of claim 9, wherein a fluoroscopic tracker fiducial marker is further employed with respect to performing 2D-2D registration.

* * * * *